Oct. 16, 1962                      E. SHAY                      3,058,378
METHOD AND MEANS FOR TREATING EXTENDED MATERIAL
Original Filed Sept. 22, 1958                      2 Sheets-Sheet 1
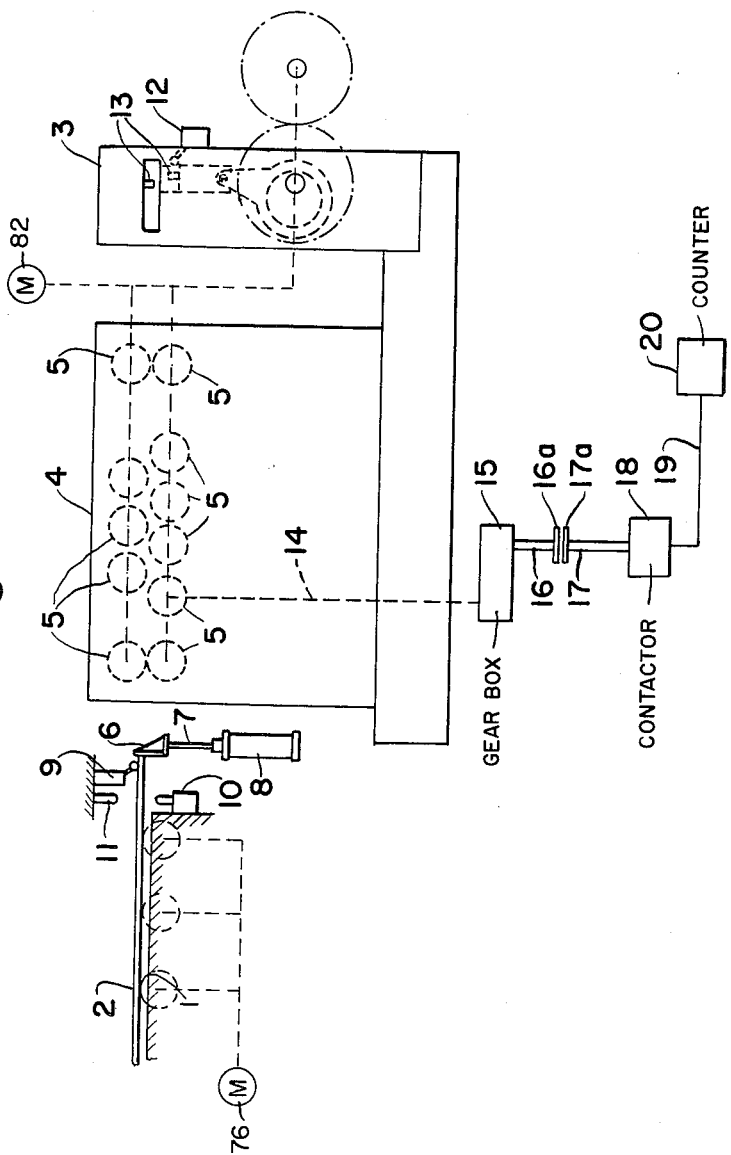
INVENTOR.
Eli Shay

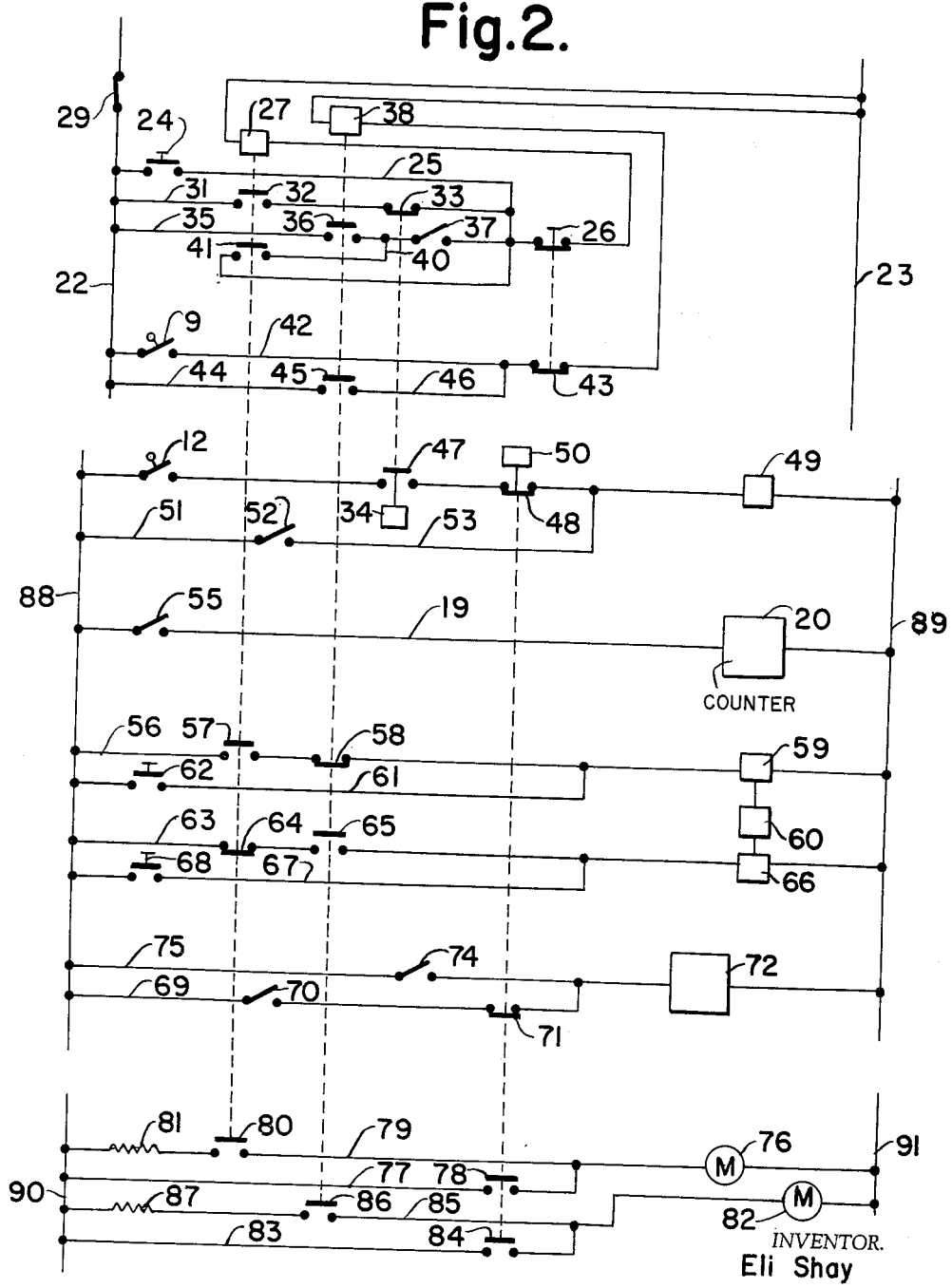

United States Patent Office 3,058,378
Patented Oct. 16, 1962

3,058,378
METHOD AND MEANS FOR TREATING
EXTENDED MATERIAL
Eli Shay, Warren, Ohio, assignor to The Wean Engineering Company, Inc., Warren, Ohio, a corporation of Ohio
Continuation of application Ser. No. 762,555, Sept. 22, 1958. This application Apr. 28, 1961, Ser. No. 107,619
9 Claims. (Cl. 83—38)

This invention relates to means for controlling the feed of a material, such as metal strip, to flying shears and the like and is particularly suited for use with flying apparatus which misses or skips one or more cuts during its operation. This application is a continuation of my copending application Serial No. 762,555, filed September 22, 1958 and now abandoned.

In cutting, pressing, or otherwise treating fast-moving strip and like products, use of a "flying" machine is required to avoid damage to the strip product. One such well-known machine is a flying shear in which the shear head reciprocates back and forth, the knives coming together in a cutting stroke on the forward reciprocation of the shear head. To extend the length of pieces of strip cut by the shear, the apparatus is frequently arranged to miss a cut on one or more reciprocations. The shear, for example, may make two or three or more reciprocations without having its knives close in a cutting stroke, thereby extending the length of strip which passes through between successive cuts of the knife. Thus, with a limited adjustment for length of cut, the effective length of sheets cut may be multiplied by use of a mis-cut feature. Apparatus employing the principle above described is illustrated, for example, in Patent 2,642,937 to Karl W. Hallden and Patent 2,827,962 to Albert J. Sarka.

While I specifically refer to my invention with respect to a flying shear, it will be understood that the invention is equally applicable to any other type of flying device, and I use the term "flying shear" in a broad sense descriptive of other "flying" apparatus than those which may be strictly termed as shears but which follow the same principle. In like manner I use the word "strip" generically to indicate the material fed to the shear, although such material is sometimes otherwise referred to as "coils," "plate," "stock," or the like.

Frequently flying shears are used to cut sheets of fixed length from a strip of finite length. A problem which arises is that the shear will cut the strip into a plurality of predetermined lengths leaving an indeterminate scrap length at each end of the strip shorter than the desired sheet lengths. Frequently, the scrap ends aggregate a length well in excess of the sheet lengths into which the strip is being cut. The result is that strip material from which an additional piece of the desired length might be cut is instead cut into two scrap ends of substantial size. The resulting scrap loss can be quite large. If heavy gauge hot-rolled steel strip, for example, is being cut into long lengths, each length may exceed two thousand pounds in weight. It will be seen, therefore, that the waste resulting from failure to cut the greatest number of sheets of desired length from a strip may be substantial. Although the operator of the shear may attempt to coordinate the strip and shear positions by inspection for the purpose of reducing the scrap cut at the leading end to as small a length as possible, it is time-consuming to do so. Where, however, the shear is arranged to miss one or more cuts in a cycle, it becomes impossible to synchronize the shear and leading end of the strip for minimum scrap length by inspection.

I have invented novel and useful means to control flying shears and to synchronize them with the strip or the material being supplied to the shear. I provide a flying shear, strip feed means to the shear, means to determine the cutting stroke of the shear, means to stop feed of the strip at a predetermined position, and means causing advance of the strip from the predetermined position at a predetermined time after the cutting stroke of the shear. I preferably provide a strip feed table, and strip stop means associated with the table. I prefer to place the strip in a previously determined position and then to cycle the shear, noting when the knives close in cutting position. The apparatus is then operated for a portion of a new cycle, and at an appropriate point the previously placed strip is advanced to the shear to pass between the knives shortly before they close, thereby cutting the desired crop length from the front of the advancing strip.

In the accompanying drawings, I have illustrated a present preferred embodiment of my invention in which
FIGURE 1 is a schematic view of a flying shear embodying my invention; and
FIGURE 2 is a schematic wiring diagram illustrating the invention.

Referring now to FIGURE 1, a strip feed table 1 is provided upon which steel strip 2 is fed forwardly by well-known means toward a flying shear 3. The strip passes between the rolls of a metering roller leveler 4 whose rolls 5 are driven at a speed synchronized with the speed of the shear. The rolls engage the strip and advance it forwardly when they rotate. A strip stop 6 is provided at the delivery end of table 1 intermediate the table and the roller leveler. It is illustrated, in FIGURE 1 in its upper position, blocking feed of the strip but is mounted on piston rod 7 of a double-acting pneumatic cylinder 8 and may be drawn downwardly to permit strip 2 to be fed into roller leveler 4. A flag switch 9 is mounted adjacent stop 6 and is closed when strip 2 comes against stop 6. A photoelectric device comprises a lamp 10 and a photoelectric cell 11 placed on opposite sides of the strip pass line slightly ahead of stop 6. A flag switch 12 is mounted upon the reciprocating shear head and is closed by shear knives 13 when they close in cutting position but otherwise remains open. The input shaft 14 of an auxiliary gearbox 15 is connected to roller leveler 4 and is driven synchronously with the rolls 5. The output shaft 16 of gearbox 15 is connected to a shaft 17 through clutch plates 16a and 17a. Clutch plates 16a and 17a are engaged or disengaged by the action of a small electric relay. Shaft 17 drives a contactor 18 which opens and closes an internal switch in a fixed relationship to the speed of the rolls in roller leveler 4. Contactor 18 is connected through wires 19 to a counter 20 which is described in detail below.

In FIGURE 2, the wiring diagram is shown schematically. Power lines or wires 22 and 23 supplying electric power at 230 volts D.C. are illustrated. Supply of power to wires 22 and 23 is controlled by switch 29 which is normally closed. A manually operated slow speed start switch 24 is normally in open position in wire 25. Wire 25 leads from switch 24 through normally closed switch 26 to relay 27 and then to wire 23 to complete the circuit. A wire 31 leads from power line 22 through switch 32 and switch 33 to switch 26. Switch 32 is normally in open position but is closed when relay 27 is energized. Switch 33 is activated by relay 34 which is controlled by photoelectric cell 11. Switch 33 is normally closed until a piece of strip on table 1 breaks the light beam in the photoelectric unit energizing relay 34 and causing switch 33 to open. An additional wire 35 leads from power line 22 through switches 36 and 37 to switch 26. Switch 36 is operated by relay 38 and is normally open until relay 38 is energized. Switch 37 is physically contained within counter 20 and is mechanically operated.

It is normally open but is closed by counter 20 in a manner described below. A shunt circuit around switch 37 is provided by wire 40 and switch 41 controlled by relay 27. Flag switch 9 is connected to power line 22 and through a wire 42, switch 43, and relay 38 to power line 23. A shunt around flag switch 9 is provided by wire 44, switch 45 and wire 46. Switch 45 is normally open but is closed when relay 38 is energized.

Wires 88 and 89 are provided with power at 110 volts A.C. A circuit is provided between power lines 88 and 89 through flag switch 12, switch 47, switch 48 and relay 49. Switch 47 is normally open but is closed when relay 34 is energized. Switch 48 is normally in closed position but is opened by operation of relay 50. Relay 49, when energized, engages clutch plates 16a and 17a and causes roller leveler 4 to drive contactor 18. Relay 50 is controlled by timer 72 in the manner described below. A shunt around switches 12, 47 and 48 is provided through wire 51, normally open switch 52, and wire 53. Switch 52 is contained within counter 20 and is operated by operation of the counter. A switch 55 placed within contactor 18 is connected to wire 88. Switch 55 is a cam switch which opens and closes during the time the counter is driven in a fixed relationship to the speed of rotation of rolls 5 in roller leveler 4. For example, switch 55 may close once for each inch of peripheral travel of rolls 5. When closed, it completes a circuit through wire 19 to counter 20 and then to wire 89. Counter 20 is a standard type such as an Eagle Signal Microflex Predetermining Counter and operates in a manner which will be described more fully below. A circuit is provided from power line 88 through wire 56, switch 57, switch 58 to relay 59 and power line 89. Relay 59 operates a four-way air valve 60 which controls pneumatic cylinder 8. When relay 59 is energized, valve 60 actuates stop 6 to its upward position blocking forward movement of strip 2. A shunt 61 around switches 57 and 58 is provided and is equipped with a normally open, manually operated switch 62 for manual upward operation of the stop. Switch 57 is normally open and is closed by energizing relay 27. Switch 58 is normally closed but is opened by energizing relay 38. A wire 63 extends from power line 88 through switch 64, switch 65 and relay 66 to power line 89. Switch 64 is controlled by relay 27 and is normally closed. Switch 65 is controlled by relay 38 and is normally open. Relay 66 also operates valve 60. Energizing relay 66 actuates valve 60 to cause stop 6 to move down into a retracted position permitting the strip to be moved into roller leveler 4. A shunt 67 around switches 64 and 65 is provided having a normally open manually controlled switch 68 for manually retracting stop 6. A wire 69 extends from power line 88 through normally open switch 70 and switch 71 through a timer 72 to wire 89. Switch 70 is contained within counter 20 and is normally open but is closed by counter 20. Switch 71 is normally closed but is opened when relay 50 is energized. Timer 72 is of well-known design such as a Square D Pneumatic Timer and will, when energized, close switch 74, thereby creating a holding circuit for its own operation through switch 74 and wire 75. Switch 74 is physically enclosed within timer 72.

The strip feed drive motor is indicated at 76. It is connected across power lines 90 and 91 by wire 77 and switch 78. Wires 90 and 91 have a variable voltage imposed on them and supply power to the drive motors for the entire line. The voltage may be adjustably regulated by a Ward Leonard or other conventional control system to regulate the overall line speed. Switch 78 is normally open but is closed by operation of relay 50. Motor 76, when so connected, will operate at full speed to the extent permitted by the voltage across wires 90 and 91. It may also be connected through wire 79, switch 80, and resistor 81. Switch 80 is normally open but is closed by operation of relay 27. When motor 76 is connected solely through resistor 81, it will operate at a lower speed to drive the strip forwardly and into roller leveler 4 at a very slow speed. The shear and roller leveler are driven by motor 82. It is connected between power lines 90 and 91 through wire 83 and normally open switch 84 which is operated by relay 50. It may alternatively be connected across the line through wire 85, switch 86 and resistor 87. When motor 82 is connected through wire 83 and switch 84, it will operate at full speed for the voltage applied on wires 90 and 91. When the sole connection is through switch 86 and resistor 87, it will operate at a reduced speed which is synchronized with the slow speed of motor 76.

Counter 20 counts the electrical impulses reaching it by successive closings of switch 55. When counter 20 is first activated by operation of switch 55, it will close switch 52, thereby holding clutch relay 49 energized. After a preset number of counts has been received from switch 55 by counter 20, indicating a known amount of operation of shear 3 and roller leveler 4, counter 20 will close switch 37. The interval of time or number of counts from the commencement of counting until switch 37 closes may be adjusted by the operator. Shortly thereafter, counter 20 will close switch 70. After a further short period, counter 20 will open switches 37, 52 and 70.

Timer 72 is of a conventional type. It will, when energized, close switch 74 and open switch 29 which is physically contained therein. It will also energize relay 50, thereby opening switches 48 and 71 and closing switches 78 and 84. The timer will hold relays 50 and 74a energized for a selected period of time, after which it will break the circuit, returning switches 48 and 71 to closed position and switches 78 and 84 to open position. It will at the same time close switch 29 and open switch 74.

In operation, a coil of strip is placed in a conventional uncoiler (not shown) and is fed onto table 1. The operator then momentarily closes switch 24 completing a circuit through relay 27. Relay 27 closes switch 32, thereby holding itself energized. It also simultaneously closes switch 80, starting motor 76 at slow speed and causing it to advance the strip slowly along table 2. Relay 27 will also close switch 57, energizing relay 59 and moving valve 60 to a position to raise stop 6. When the strip is advanced to the point where it breaks the light beam between lamp 10 and photoelectric cell 11, relay 34 will be energized, opening switch 33, breaking the holding circuit to relay 27, thereby returning the associated switches to their original positions and stopping motor 76. Inertia of the system will cause the strip to drift forward against stop 6 which remains in raised position. When the strip hits stop 6, it will be stopped and will close flag switch 9, thereby energizing relay 38, and closing switches 36, 45, 65, and 86, and opening switch 58. Closing of switch 86 will drive shear motor 82 at slow speed. Closing of switch 65 will complete a circuit to relay 66 through wire 63, switch 64, and switch 65, thereby actuating four-way valve 60 and causing withdrawal of stop 6. The shear motor will continue to drive the shear at low speed. When the shear knives close on a cutting stroke, flag switch 12 will momentarily close. The strip remains in position blocking the light beam to photoelectric cell 11, thereby energizing relay 34 and holding switch 47 in closed position. Thus, when flag switch 12 is closed, clutch relay 49 will be energized, engaging clutch plates 16a and 17a and causing switch 55 to open and close in a fixed relationship to the speed of the shear and roller leveler. The impulses will be received by counter 20 which will immediately close switch 52, holding clutch relay 49 energized. After a preset number of counts, counter 20 will momentarily close switch 37. This will energize relay 27 through wire 35 and switch 36. When relay 27 operates, it will close switch 41, thereby creating a holding circuit through wire 35, switch 36, wire 40 and switch 41 and shunting switch 37. Operation of relay 27 will also close switch 80, starting entry motor 76 at slow speed. Switch 57 will also be closed by operation of relay 27, but since switch 58 is now held in open position by relay 38, stop 6 will not move. Motor 76 will then feed strip 2 slowly into the roller leveler. It will be apparent that the length of time which elapses between the closing of shear knives 13 and the commencement of feeding strip 2 into roller leveler 4 depends upon the setting of counter 20. It is set by a predetermined scale to begin the feed of strip into the roller leveler and shear to produce the smallest practicable crop end at the front of the strip. On the first closing of the shear knives, after closing flag switch 12 as above described, the knives will, if counter 20 is properly adjusted to the cutting cycle of shear 3, cut the smallest practicable crop from the leading end of the strip. A separate setting of the counter must, of course, be made for each different length of cut for which the shear may be adjusted. If the counter is set manually, it may be calibrated directly in sheet lengths, or a conversion table may be supplied to the operator. Alternatively, the counter may be connected directly to the shear controls.

After allowing sufficient time for the strip to be engaged by rolls 5 on roller leveler 4, counter 20 will momentarily close switch 70, energizing timer 72. Timer 72 will close switch 74 and open switch 29. It will also energize relay 50 which will throw motors 76 and 82 on the line for full speed operation. Although switches 48, 71, 78, and 84 are shown for purposes of illustration as operated by relay 50, they may also be directly operated by timer 72. Opening of switch 29 will break the circuits through relays 27 and 38, thereby breaking their own holding circuits and allowing them to return to inactive position. Operation of relay 50 will also open switch 48, breaking the circuit to clutch relay 49 and disconnecting contactor 18. The apparatus will then run at full speed. Timer 72 will hold itself energized until a set time expires. With strips of fixed length, the operator may set the timer to run the shear only long enough to pass through the entire length of strip of table 2. The timer will then be de-energized, opening switch 74, closing switch 29 and de-energizing relay 50, returning the apparatus to condition for another strip to be fed forwardly on table 1. The length of time timer 72 will remain operative is set by the operator.

Switches 26 and 43 are normally closed but may be opened manually to stop the feeding of strip into the apparatus during the initial alignment of the strip. Switches 62 and 68 are manually operated and may be used to move stop 6 to the upper or lower position under manual control of the operator for further assistance in initially setting up the apparatus.

From the foregoing, it will be seen that I have invented new and useful apparatus for synchronizing flying shears and the like. It allows strip to be fed quickly, automatically, and expeditiously into the shear and produces the largest possible number of sheets which can be cut from a strip of given length. While I have illustrated and described a present preferred embodiment of my invention, it is to be understood that the invention is not so limited and may be otherwise variously practiced within the scope of the following claims.

I claim:

1. Means for shearing metal stock for reduced scrap loss comprising a flying shear of the mis-cut type and shear feed means in advance of the shear knives and driven synchronously with the shear to feed stock thereto, stock feed means positioned in advance of the shear feed means and arranged to feed stock toward the shear feed means, stock stop means between the two feed means effective in one position to stop forward movement of the stock, sensing means arranged adjacent the shear knives to determine when the knives close in cutting position, control means in operative relationship with the sensing means, stock feed means, and stock stop means, and synchronized to the operation of the shear and shear feed means to sense their operation, the knife sensing means being connected to the control means to begin sensing of the extent of shear operation at the time the shear knives close, said control means being in controlling relationship to the stock feed means and the stock stop means and operating to withdraw the stock stop means and cause the stock feed means to advance the stock after sensing of a predetermined extent of operation of the shear and shear feed means whereby a crop end of a predetermined length is cut from the stock.

2. Means for shearing metal stock for reduced scrap loss comprising a fly shear of the mis-cut type and shear feed means in advance of the shear knives and driven synchronously with the shear to feed stock thereto, stock feed means positioned in advance of the shear feed means and arranged to feed stock toward the shear feed means, stock stop means between the two feed means effective in one position to stop forward movement of the stock, sensing means arranged adjacent the shear knives to determine when the knives close in cutting position, control means in operative relationship with the sensing means, stock feed means, and stock stop means, and synchronized to the operation of the shear and shear feed means to sense their operation, the knife sensing means being connected to the control means to begin sensing of the extent of shear operation at the time the shear knives close, said control means being in controlling relationship to the stock feed means and the stock stop means and operating to withdraw the stock stop means and cause the stock feed means to advance the stock after sensing of a predetermined extent of operation of the shear and shear feed means whereby a crop end of a predetermined length is cut from the stock, said shear means being arranged to operate at a slower than normal speed until after the shear cuts the crop end.

3. Means for shearing metal stock for reduced scrap loss comprising a flying shear of the mis-cut type, shear drive means, stock feed means in advance of the shear for feeding stock to the shear, stop means intermediate the shear and the stock feed means and effective in one position to stop forward movement of the stock to the shear knife sensing means to determine when the shear knives close in cutting position, control means in operative connection with and actuated by the knife sensing means, said control means being also in operative connection with the shear drive means to sense operation of the shear through a cycle following closing of the knives, said control means withdrawing the stop means to permit free passage of the stock and commencing advance of the stock toward the shear after operation of the shear through a predetermined part of its cycle, the leading end of the strip thereby passing between the shear knives immediately before they close, marking completion of the cycle.

4. Means for shearing metal stock for reduced scrap loss comprising a flying shear of the mis-cut type, shear drive means, stock feed means in advance of the shear for feeding stock to the shear, stop means intermediate the shear and the stock feed means and effective in one position to stop forward movement of the stock to the shear knife, sensing means to determine when the shear knives close in cutting position, control means in operative connection with and actuated by the knife sensing means, said control means being also in operative connection with the shear drive means to sense operation of the shear through a cycle following closing of the knives, said control means withdrawing the stop means to permit free passage of the stock and commencing advance of the stock toward the shear after operation of the shear through a predetermined part of its cycle, the leading end of the strip thereby passing between the shear knives immediately before they close, marking completion of the cycle, said control means further limiting the shear operation to a slower than normal speed until the shear first engages the stock following which the control means causes the shear to accelerate to normal speed.

5. Means for shearing strip for reduced scrap loss comprising a flying shear missing at least one cut during operation, means for feeding strip to a point in front of the shear, means to stop forward movement of the strip at said point, means in sensing relationship to the shear knives to determine when the shear knives close in cutting position, control means actuated thereby to measure operation of the shear through a cycle following closing of the knives, said control means withdrawing the stop means and commencing advancement of the strip toward the shear after operation of the shear through a determined part of its cycle, the leading end of the strip thereby passing between the shear knives immediately before they close, marking the completion of the cycle.

6. Means for shearing metal stock for reduced scrap loss comprising a flying shear of the mis-cut type, stock feed means in advance of the shear for feeding stock toward the shear, means to stop forward movement of the stock in advance of the shear, shear drive means connected to the shear means and operable to drive it at normal speed and at less than normal speed, knife sensing means positioned to sense when the shear knives close, control means in operative connection with the sensing means, feed means, stop means, and the shear drive means, the knife sensing means being connected to the control means to begin sensing of the extent of shear operation at the time the shear knives close, said control means causing the feed means to advance the stock after sensing a predetermined extent of operation of the shear whereby a crop end of predetermined length is cut by the shear from the stock, said control means controlling the shear drive means to drive it initially at less than normal speed and then at normal speed after the shear has cut the crop end from the stock.

7. The method of shearing stock into lengths with a flying shear of the mis-cut type and of reducing scrap loss from the stock which comprises advancing the stock toward the shear, stopping the stock at a point in advance of the shear, cycling the shear, sensing the point at which the shear knives close, then sensing the extent of operation of the shear following the time at which the shear knives close, and then advancing the stock after a predetermined extent of operation of the shear following closing of the shear knives whereby a crop end of the desired length is cut from the forward end of the stock and the shear thereafter cuts pieces of the desired length from the stock.

8. The method of shearing stock into lengths with a flying shear of the mis-cut type and of reducing scrap loss from the stock which comprises advancing the stock toward the shear, stopping the stock at a point in advance of the shear, cycling the shear at a less than normal speed, sensing the point at which the shear knives close, then sensing the extent of operation of the shear following the time at which the shear knives close, and thereafter advancing the stock after a predetermined extent of operation of the shear following closing of the shear knives whereby a crop end of the desired length is cut from the forward end of the stock, and then accelerating the shear to normal speed whereby the shear cuts pieces of the desired length from the stock at normal operating speed.

9. The method of shearing stock into lengths with a flying shear of the mis-cut type and of reducing scrap loss from the stock which comprises advancing the stock toward the shear, stopping the stock at a point in advance of the shear, cycling the shear, sensing the extent of operation of the shear beginning at a point in its cycle and then advancing the stock after a predetermined extent of operation of the shear from that point in its cycle whereby a crop end of the desired length is cut from the forward end of the stock and thereafter operating the shear to cut pieces of the desired length from the balance of the stock.

References Cited in the file of this patent

UNITED STATES PATENTS

| | | |
|---|---|---|
| 1,949,717 | Iversen | Mar. 6, 1934 |
| 2,692,361 | Asbury | Oct. 19, 1954 |
| 2,728,040 | Hunt | Dec. 20, 1955 |